United States Patent [19]

von Bergen et al.

[11] Patent Number: 5,308,269

[45] Date of Patent: May 3, 1994

[54] SEAL DEVICE FOR ROTATING SHAFTS, IN PARTICULAR STERN TUBE SEAL FOR PROPELLER SHAFTS OF A SHIP

[75] Inventors: Ernst-Peter von Bergen, Ahlefeld; Günter Pietsch, Hamburg, both of Fed. Rep. of Germany

[73] Assignee: Blohm & Voss AG, Hamburg, Fed. Rep. of Germany

[21] Appl. No.: 969,889

[22] Filed: Oct. 30, 1992

[30] Foreign Application Priority Data

Oct. 30, 1991 [DE] Fed. Rep. of Germany ....... 4135709

[51] Int. Cl.5 ............................................. B63H 23/36
[52] U.S. Cl. ...................................... 440/112; 416/174
[58] Field of Search ................ 440/111, 112; 277/22; 384/313, 315, 316, 317, 318, 321, 900; 416/174

[56] References Cited

U.S. PATENT DOCUMENTS

| 3,580,214 | 5/1971 | Muller | 440/112 |
| 3,863,737 | 2/1975 | Kakihara | 440/112 |
| 3,934,952 | 1/1976 | Gardner | 440/112 |
| 4,861,294 | 8/1989 | Ousley, II | 440/112 |

FOREIGN PATENT DOCUMENTS

| 1904105 | 8/1970 | Fed. Rep. of Germany . | |
| 2239570 | 2/1974 | Fed. Rep. of Germany . | |
| 2409954 | 9/1975 | Fed. Rep. of Germany . | |
| 3006206 | 8/1981 | Fed. Rep. of Germany . | |
| 3034561 | 3/1982 | Fed. Rep. of Germany | 440/112 |
| 3106318 | 9/1982 | Fed. Rep. of Germany . | |
| 3535855 | 4/1987 | Fed. Rep. of Germany . | |
| 3818890 | 12/1989 | Fed. Rep. of Germany . | |
| 682414 | 8/1979 | U.S.S.R. | 440/112 |
| 1495837 | 12/1977 | United Kingdom . | |
| 2093538 | 9/1982 | United Kingdom . | |

*Primary Examiner*—David M. Mitchell
*Assistant Examiner*—Stephen P. Avila
*Attorney, Agent, or Firm*—Nils H. Ljungman & Associates

[57] ABSTRACT

The invention employs the principle of the prior art for cooling a heated body by means of so-called heat pipes, with seal devices for rotating shafts, in particular for a ship's propeller shaft. According to this principle, an externally closed chamber extending in the longitudinal direction and filled with a liquid working fluid extends on one end into the body to be cooled, and on the other end into a cold medium, whereby a constant circulation takes place, so that the work fluid is evaporated in the hot portion of the chamber, the vapor flows into the cold portion of the chamber, condenses there, and the condensate is returned to the hot portion by way of a capillary structure (FIG. 1).

14 Claims, 5 Drawing Sheets

SEAL DEVICE FOR ROTATING SHAFTS, IN PARTICULAR STERN TUBE SEAL FOR PROPELLER SHAFTS OF A SHIP

BACKGROUND OF THE INVENTION

Field of the Invention

This invention relates to a seal device for rotating shafts, in particular a stern tube seal for ship propeller shafts with or without a shaft bushing. The shafts are in contact with a relatively cold medium, preferably seawater, and a relatively hot medium, preferably lubricating oil. There are, on the shafts, two or more gaskets supported by a stationary support system and which gaskets are designed as lip seals and/or rotating mechanical seals. There is equipped a device to cool the gaskets, which has passages penetrating the shaft and/or the support system for the circulation of a liquid cooling medium in a closed circuit.

Background Information

In seals of the type described above, which are disclosed, for example, in Federal Republic of Germany Laid Open Patent Application Nos. 2239570, 2409954, 3535855 and 3818890, the circulation of the cooling medium essentially takes place through a system of passages connected to passages penetrating the shaft and/or a gasket support system. The system of passages is connected to a circuit which extends outside the seal device. Typically, in the circuit there is a conveyor mechanism to maintain circulation of the condensing medium. Also, as a rule, there is a cooling source or a heat exchanger interacting with such a cooling source. Naturally, a considerable expense for equipment is required. An additional problem is that, since the circulation medium must perform a cooling function and a lubrication function simultaneously, neither function can be performed optimally, but an acceptable compromise must be reached. Additionally, when the passages are located in the shaft or shaft bushing, water hammers, and thus oscillations, of the cooling medium can occur as a result of the rotation of overflow openings. As a result, the gaskets are exposed to additional stress, in particular when the gaskets are designed as lip seals.

German Laid Open Patent Application No. 1904105, of course, discloses that "heat pipes" can be used for cooling. As disclosed therein, such heat pipes may be externally connected and may be equipped with: a segment which absorbs external heat, in which the coolant is vaporized; and a segment which discharges heat externally, in which the vapor condenses. The former segment may be termed the "hot spot" and the latter segment may be termed the "cold spot". In such a context, the coolant circulates inside the heat pipes between the hot and cold spots, and there are capillaries, for the return of the condensate, which capillaries extend over the inside surface of, and possibly also over a portion of, the inside of the heat tubes. Generally, by means of heat pipes, relatively large heat flows can be transported, or effected, in the presence of small temperature differences.

OBJECT OF THE INVENTION

The object of the invention is to overcome problems and shortcomings such as those mentioned above, and to refine a seal device of the type described above in such a way that there essentially will be no need either for a system of lines leading outwardly or for cooling sources. Other objects of the present invention are to separate the coolant and lubricant and also to prevent damaging oscillations. These and other objects of the present invention are achieved by means of features disclosed hereinbelow.

SUMMARY OF THE INVENTION

As a result of the present invention, not only are the problems and shortcomings, mentioned further above, eliminated, but a type of automatic control of the cooling process generally takes place. The automatic control comes about because a cooling effect is exercised when the temperature of the gaskets, caused by friction, is so high that an evaporation process occurs at the hot spot, while when the temperature drops, the evaporation process stops and, thus, the cooling stops. Such control can also be understood as a safety measure if, for example, in icy waters, excessive cooling of the gaskets could otherwise potentially lead to icing and subsequently damage the gaskets.

Other advantageous embodiments of the present invention are disclosed hereinbelow. For example, the cooling medium can include water, alcohols or other fluids with a similar boiling temperature, whereby those fluids with good thermal conductivity are preferred.

Preferably, the passages for the heat pipes are located only inside the shaft or the shaft bushing, or only inside the support system for the gaskets. The former configuration is preferred, because it allows for the installation of the heat pipes as close as possible to the points of maximum friction and heat generation, namely the points of contact between the gaskets and the shaft.

In sealing devices with a shaft bushing, a relatively simple solution for the installation of the heat pipes in the wall of the shaft bushing may be provided.

Other advantages of the present invention may be utilized under certain conditions where there is no requirement to cool all the gaskets, but only some of them, and the rest can be left uncooled.

As disclosed hereinbelow, according to the present invention, the capillary structure may be improved, in that a loosening or deformation of the capillary substance can be prevented, even after rather long operation.

In summary, one aspect of the invention resides broadly in an ocean-going vessel comprising: a hull; shaft means extending within the hull and outwardly therefrom; a propeller being mounted at an end of the shaft means for propelling the ocean-going vessel; means for rotatingly driving the shaft means to rotate the propeller; a shaft support system, disposed at least partly within the hull, for encasing the shaft means; sealing means, disposed within the shaft support system, for sealing about the shaft means; a first portion of the shaft means, being disposed in the vicinity of the sealing means, being configured for being in contact with a lubricating medium, the lubricating medium for lubricating the shaft means; another, second portion of the shaft means, being disposed away from the sealing means, being configured for being in contact with water disposed outside of and about the hull, the outside water generally having a substantially lower temperature, during operation of the propeller, than the lubricating medium; means for cooling the first portion of the shaft means; the cooling means comprising: heat pipe means disposed along a longitudinal extent of the shaft means; a first portion of the heat pipe means being disposed in a thermally conductive relationship with the first portion of the shaft means and with the lubricating medium; a second portion of the heat pipe means being disposed in a thermally conductive relationship with the second portion of the shaft means and with the outside water; coolant means for circulating within the heat pipe means; the heat pipe means having an interior surface portion; the coolant means being configured for vaporizing, upon thermal interaction with the lubricating medium, at the first portion of the heat pipe means and for condensing, upon thermal interaction with the outside water, at the second portion of the heat pipe means; and capillary means, extending along the interior surface portion of the heat pipe means, for directing return flow of the coolant means between the second portion of the heat pipe means and the first portion of the heat pipe means, when the coolant means has condensed at the second portion of the heat pipe means.

Another aspect of the invention resides broadly in a stern tube seal of a deep-draft vessel, the deep-draft vessel comprising: a hull; shaft means extending within the hull and outwardly therefrom; a propeller being mounted at an end of the shaft means for propelling the vessel; means for rotatingly driving the shaft means to rotate the propeller; a shaft support system, disposed at least partly within the hull, for encasing the shaft means; a first portion of the shaft means being configured for being in contact with a lubricating medium, the lubricating medium for lubricating the shaft means; another, second portion of the shaft means being configured for being in contact with water disposed outside of and about the hull, the outside water generally having a substantially lower temperature than the lubricating medium during operation of the propeller; the stern tube seal comprising: sealing means, disposed within the shaft support system, for sealing about the shaft means; the sealing means being disposed in the vicinity of the first portion of the shaft means and away from the second portion of the shaft means; means for cooling the first portion of the shaft means; the cooling means comprising: heat pipe means disposed along a longitudinal extent of the shaft means; a first portion of the heat pipe means being disposed in a thermally conductive relationship with the first portion of the shaft means and with the first medium; a second portion of the heat pipe means being disposed in a thermally conductive relationship with the second portion of the shaft means and with the second medium; coolant means for circulating within the heat pipe means; the heat pipe means having an interior surface portion; the coolant means being configured for vaporizing, upon thermal interaction with the first medium, at the first portion of the heat pipe means and for condensing, upon thermal interaction with the second medium, at the second portion of the heat pipe means; and capillary means, extending along the interior surface portion of the heat pipe means, for directing return flow of the coolant means between the second portion of the heat pipe means and the first portion of the heat pipe means, when the coolant means has condensed at the second portion of the heat pipe means.

Yet another aspect of the invention resides broadly in a method of cooling a stern tube seal of an ocean-going vessel, the ocean-going vessel comprising a hull; shaft means extending within the hull and outwardly therefrom; a propeller being mounted at an end of the shaft means for propelling the vessel; means for rotatingly driving the shaft means to rotate the propeller; a shaft support system, disposed at least partly within the hull, for encasing the shaft means; a first portion of the shaft means being configured for being in contact with a lubricating medium, the lubricating medium for lubricating the shaft means; another, second portion of the shaft means being configured for being in contact with water disposed outside of and about the hull; the outside water generally having a substantially lower temperature than the lubricating medium during operation of the propeller; the method comprising: providing sealing means for sealing about the shaft means and disposing the sealing means within the shaft support system, for sealing about the shaft means; disposing the sealing means in the vicinity of the first portion of the shaft means and away from the second portion of the shaft means; providing means for cooling the first portion of the shaft means; providing heat pipe means for the cooling means; disposing the cooling means along a longitudinal extent of the shaft means; disposing a first portion of the heat pipe means in a thermally conductive relationship with the first portion of the shaft means and with the lubricating medium; disposing a second portion of the heat pipe means in a thermally conductive relationship with the second portion of the shaft means and with the outside water; providing coolant means for circulating within the heat pipe means; providing the heat pipe means with an interior surface portion; configuring the coolant means for vaporizing, upon thermal interaction with the lubricating medium, at the first portion of the heat pipe means and for condensing, upon thermal interaction with the outside water, at the second portion of the heat pipe means; and providing capillary means for extending along the interior surface portion of the heat pipe means, for directing return flow of the coolant means between the second portion of the heat pipe means and the first portion of the heat pipe means, when the coolant means has condensed at the second portion of the heat pipe means; the method further comprising the steps of: sealing the sealing means about the shaft means; cooling the first portion of the shaft means by way of the following steps: circulating the coolant means within the heat pipe means; effecting thermal interaction of the coolant means with the lubricating medium; effecting thermal interaction of the coolant means with the outside water; vaporizing the coolant means upon thermal interaction with the lubricating medium, at the first portion of the heat pipe means condensing the coolant means upon thermal interaction with the outside water, at the second portion of the heat pipe means; and directing, by means of the capillary means, return flow of the coolant means between the second portion of the heat pipe means and the first portion of the heat pipe means, when the coolant means has condensed at the second portion of the heat pipe means.

BRIEF DESCRIPTION OF THE DRAWINGS

The accompanying drawings schematically illustrate several embodiments of the invention by means of seven diagrams, in which.

It should be understood that, in all the figures, the identical components are identified with the same reference numbers.

DESCRIPTION OF THE PREFERRED EMBODIMENTS

Figure 1:
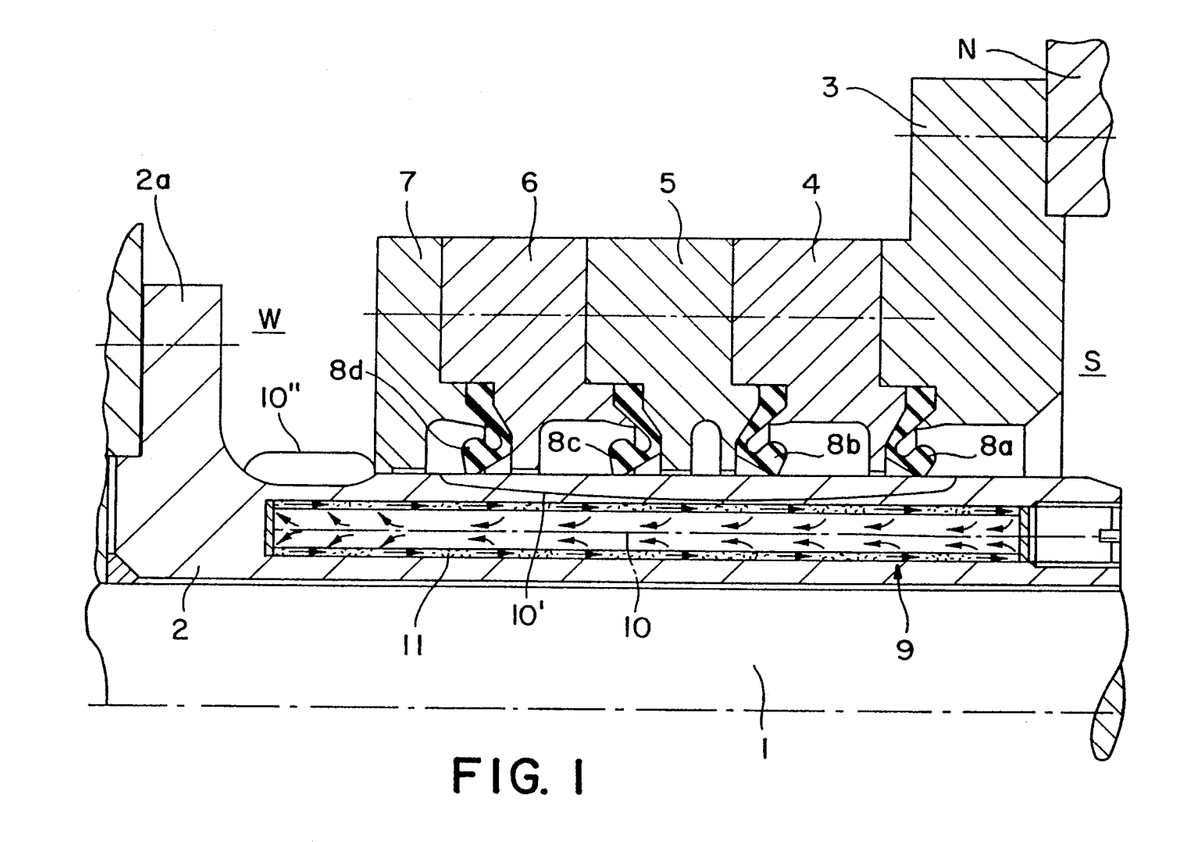
FIG. 1 shows, in longitudinal section, a seal device on a ship's propeller shaft equipped with a shaft bushing, with heat pipes located in the shaft bushing.

In FIG. 1, a ship's propeller shaft is indicated at 1, on which a shaft bushing 2 can be pulled, or mounted. The shaft bushing 2 may be torsionally connected by means of a flange 2a with the propeller (not shown). Shaft 2 essentially projects into outside water W on one end thereof. On the other end thereof, shaft 2 projects into a lubricant chamber of the shaft bearing (not shown), the lubricant chamber being generally indicated at S. Arrangements for providing lubricant to a shaft 1 of a ship are well-known to those of ordinary skill in the art and will not be described further here.

On the shaft bushing 2 there are preferably four gaskets 8a-8d designed as lip seals, which may be arranged at intervals from one another in such a way that two gaskets 8c, 8d face the external medium W to be sealed out, and two gaskets 8a, 8b face the lubricant chamber S. In other words, the four gaskets 8a-8d may essentially be arranged such that two of the gaskets are configured for sealing in the direction of outside water W and the other two are configured for sealing in the direction of lubrication chamber S.

The gaskets 8a-8d are preferably supported by a support system, including five ring parts 3, 4, 5, 6, 7, which are located next to one another in an axial, or longitudinal, direction of shaft 1. The ring part 3 adjacent to the lubricant chamber S is preferably fastened to a stern post N, to thus enable the supporting of essentially the entire seal device.

Particularly, as shown, five ring parts 3, 4, 5, 6 and 7 are preferably arranged adjacent one another along a longitudinal extent of shaft 1 and shaft bushing 2 and extend circumferentially about shaft 1 and shaft bushing 2. Preferably, each of the gaskets 8a-8d is supported at junctures between adjacent pairs of the ring parts 3-7. For example, gasket 8a may be supported between ring parts 3 and 4, while gasket 8b may be supported between ring parts 4 and 5. As shown, ring parts 3-7 are all preferably interconnected with one another and ring part 3 is preferably interconnected with a stern post N. In this manner, the ring parts 3-7 may all be supported stationarily with respect to one another and with respect to stern post N.

In the wall of the shaft bushing 2 there are preferably a number of borings 9, one of which is shown in FIG. 1, whose longitudinal axes preferably run parallel to the longitudinal axis of the shaft bushing 2, the wall thickness being defined between the gaskets 8a-8d and the shaft 1. The diameter of each boring 9 is preferably approximately half as great as the wall thickness of the shaft bushing. Preferably, a heat pipe 10 is tightly and snugly fitted into each of these borings 9. Preferably, such heat pipes include thermally conductive material and are closed on both ends to effectively form a chamber therein. Preferably located in this chamber is at least one capillary body 11, which may be in contact either with the entire inside wall of the tube, or may contact the inner wall only along a surface line.

The capillary body 11 preferably also has a tubular configuration, and can generally be fabricated from a wire mesh saturated with a liquid, vaporizable medium, preferably water. If the chamber wall is then heated in the vicinity of one end, in this case in the vicinity of the gaskets 8a-8d, to the boiling temperature of the coolant medium, the medium at this point will then evaporate from the capillary body 11, as indicated by the pairs of converging arrows in FIG. 1. The vapor will then essentially flow to the unheated or cooled chamber walls, in this case to the terminal regions 10'' of the heat pipe 10 in direct or indirect contact with the external water, and will thence condense, discharging its heat of vaporization. The return of the condensate to the evaporation portion 10' takes place inside the capillary body 11 on account of capillary forces.

On the whole, capillary arrangements for a heat pipe are well-known to those of ordinary skill in the art. In the context of the present invention, the capillary arrangement described above need not necessarily constitute the only possible capillary arrangement within the scope of the present invention. Towards the end of the disclosure, a number of patents are listed which disclose other possible arrangements for capillary bodies.

Figure 2:
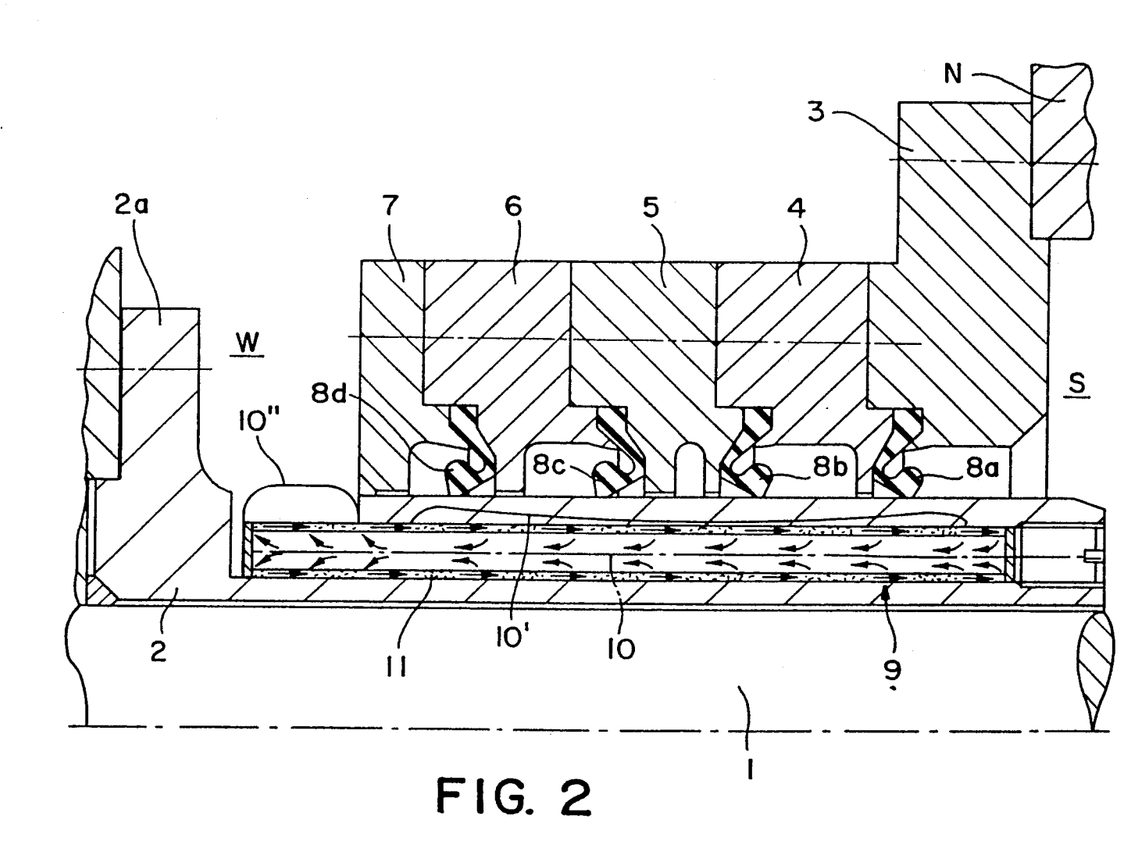
FIG. 2 shows an embodiment which differs from FIG. 1 in that the cold spot has been modified.

As shown in FIG. 2, one embodiment of the present invention, the length of the heat pipes 10 is preferably selected so that their heated portion 10', i.e. the "hot spot", projects somewhat beyond the innermost gasket 8a, and that their cooled portion 10'', i.e. the "cold spot" extends into the vicinity of the shaft bearing 2 in contact with the outside water W, which intensifies the heat exchange with the outside water W. Particularly, as shown in FIG. 2, in one embodiment of the present invention, a heat pipe 10 may be configured such that a portion of its external surface comes into direct contact with the outside water W. In this manner, heat exchange with the outside water W may be intensified. Thus, in such a configuration, at one portion of the heat pipe 10, contrary to the embodiment of FIG. 1, a portion of shaft bushing does not intervene between heat pipe 10 and outside water W.

Figure 3:
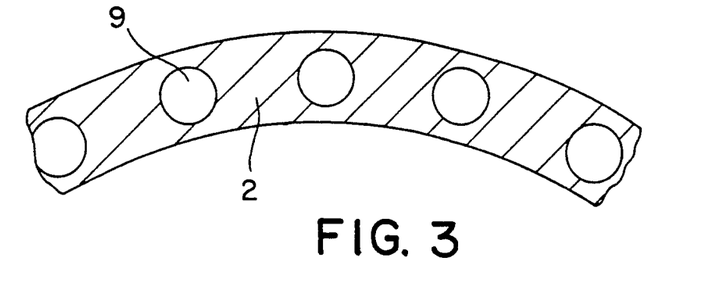
FIG. 3 shows a portion of a cross section through the shaft bushing illustrated in FIG. 1, FIGS. 4 and 5 show a longitudinal section and a cross section, respectively, through the shaft bushing of an embodiment which differs from the embodiments of FIGS. 1-3, FIGS. 6 and 7 show seal devices with a reduced range of action of the hot spot exposed to seawater, compared to the seal device illustrated in FIG. 2.

From FIG. 3, which shows only a portion of the wall of the shaft bushing 2 in cross section, it is apparent that the borings 9 for the heat pipes 10 can be distributed at intervals over the circumferential extent of the wall of the shaft bushing 2. Preferably, the borings 9 are distributed at discrete, uniform intervals in a circle about the circumferential extent of shaft bushing 2. The interval can be predetermined as a function of the amount of heat to be removed and of the expected temperature of the outside water W. For comparison, reference is made to FIG. 5, in which the intervals have been reduced so that the heat pipes are essentially close up against one another.

Figure 4:
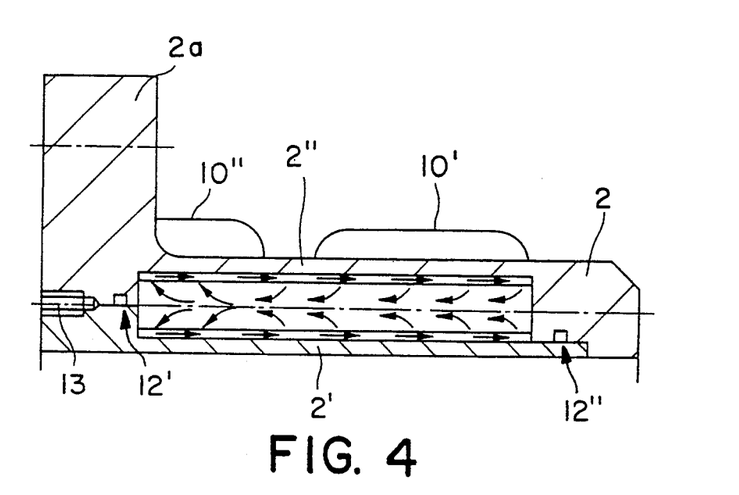
Figure 5:
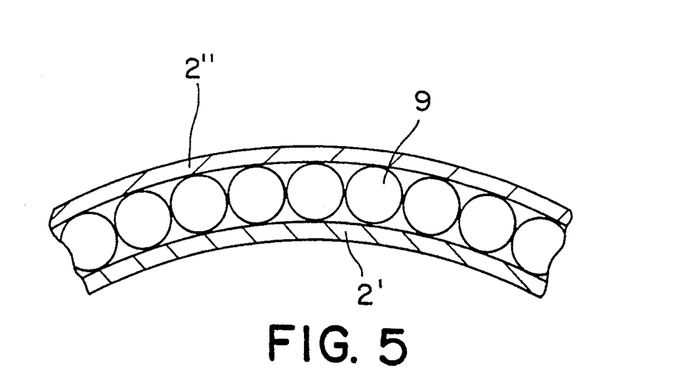

In one embodiment of the present invention, as shown in FIGS. 4 and 5, the shaft bushing 2 is designed in two sleeve-shaped portions 2' and 2''. The sealing of the sleeve-shaped parts 2', 2'' in relation to one another is essentially accomplished by gaskets 12', 12'' on the front and back end of the sleeve-shaped parts 2', 2''. Headless screws or similar devices may be installed to prevent twisting.

Figure 6:
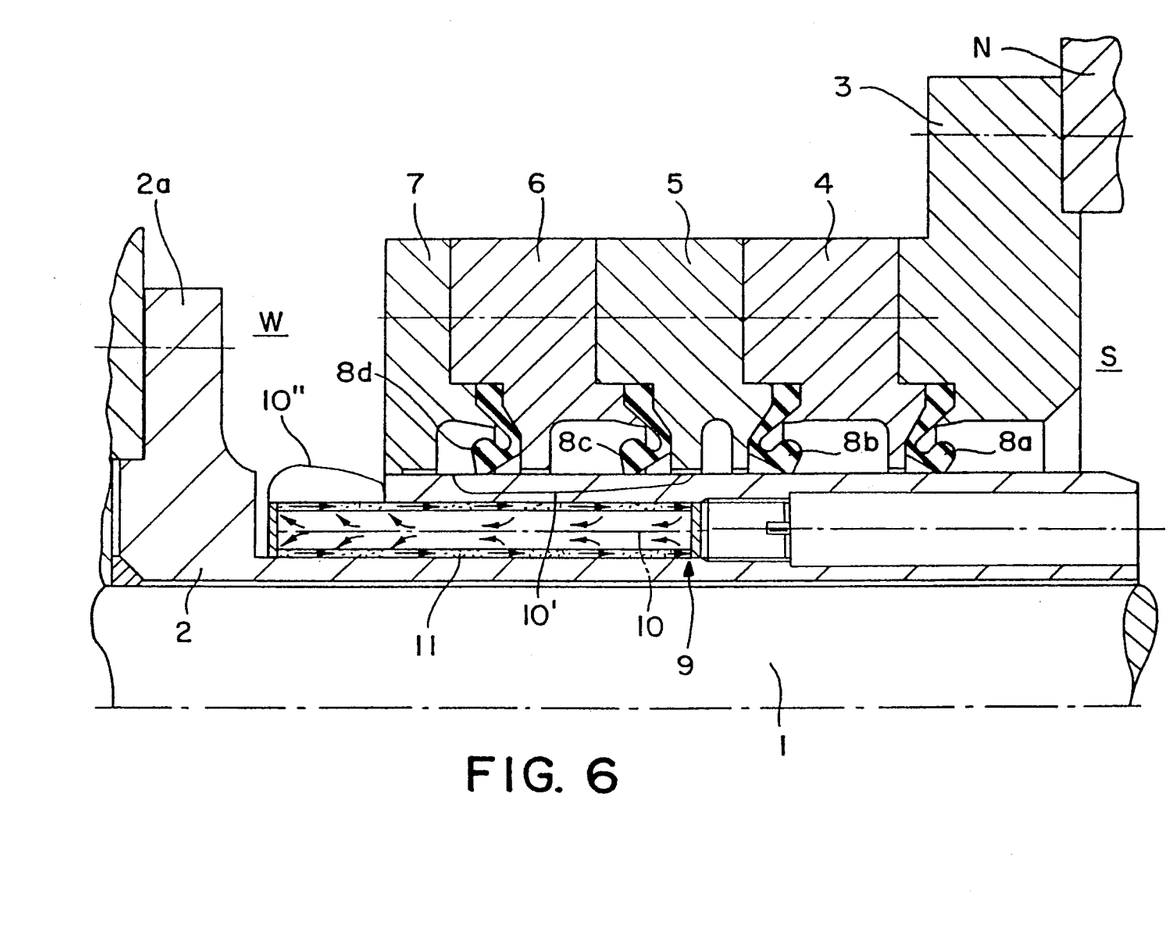
Figure 7:
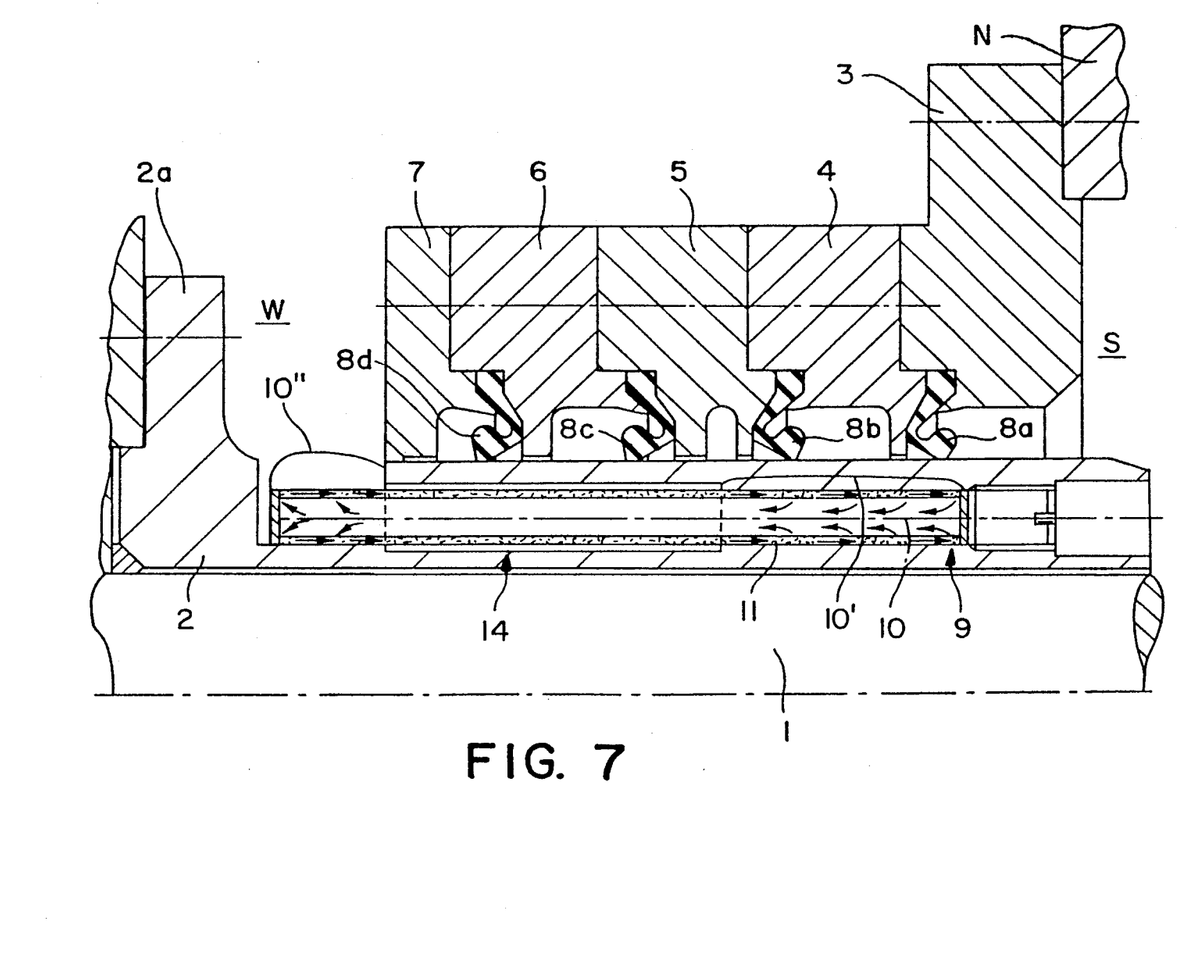

In another embodiment of the present invention, as shown in FIGS. 6 and 7, the device illustrated in FIGS. 1 and 2 may be modified so that either only the gaskets 8c, 8d facing the outside water W or only the gaskets 8a, 8b facing the lubricant chamber S are included in the cooling system. In the case of gaskets 8c and 8d, as shown in FIG. 6, this can be done easily by making the heat pipes 10 short enough so that their hot spot 10, extends only into the vicinity of the gaskets 8c, 8d facing the outside water W. On the other hand, in the case of gaskets 8a and 8b, as shown in FIG. 7, when the heat pipes 10 are installed in their full length, thermal insulation can be applied to the outside wall of heat pipes 10 in the vicinity of the gaskets 8c, 8d facing the outside water W, or heat pipes 10 can be surrounded by a thermally insulating coating, or layer, 14.

One feature of the invention resides broadly in the seal device for rotating shafts, in particular a stern tube seal for a ship's propeller shafts with or without a shaft bushing, which are in contact with a relatively cold medium, preferably seawater, and a relatively hot medium, preferably lubricating oil, on which there are also two or more gaskets supported by a stationary support system, and which are designed as lip seals and/or rotating mechanical seals, and which is equipped with a device to cool the gaskets, which has passages penetrating the shaft and/or the support system for a liquid cooling medium circulating in a closed circuit, characterized by the fact that the passages 9 are designed as heat pipes 10 or form the intake for a separate heat pipe 10, whereby each heat pipe is closed on the outside and is equipped with a segment 10' which absorbs external heat, and in which the cooling medium evaporates—the hot spot—and a segment 10" which discharges heat externally, in which the vapor condenses—the cold spot—, whereby circulation of the coolant inside the heat pipe 10 takes place between the hot spot 10' and the cold spot 10", and there are conducting means in the form of capillaries 11 for the return of the condensate, which extend over the inside surface and possibly also over a portion of the interior of the heat pipe 10, and the dimensions and the position of the heat pipe are selected so that its hot spot 10' is in the vicinity of the gaskets 8a, 8b, 8c, 8d and its cold spot 10" is in the vicinity of the cold medium, and whereby the coolant is selected so that its boiling point at the pressure prevailing in the heat pipe is slightly lower than the allowable heating temperature for the gaskets 8a, 8b, 8c, 8d.

Another feature of the invention resides broadly in the seal device, characterized by the fact that water, alcohols or other fluids with a similar boiling temperature can be used for the coolant.

Yet another feature of the invention resides broadly in the seal device, characterized by the fact that the heat pipes 10 are located exclusively in the vicinity of the support system 3, 4, 5, 6, 7 for the gaskets 8a–8d.

Still another feature of the invention resides broadly in the seal device, characterized by the fact that on a shaft 1 with a shaft bushing 2, 2', the heat pipes 10 are located exclusively in the wall of the shaft bushing 2.

Another feature of the invention resides broadly in the seal device, characterized by the fact that the shaft bushing 2, 2a is divided longitudinally into two sleeve-shaped parts 2', 2", whereby the passages 9 for the heat pipes 1 are located in the vicinity of the joint between the two parts 2', 2".

Yet another feature of the invention resides broadly in the seal device, characterized by the fact that when seals are used with several gaskets 8a–8d located axially next to one another, some of which 8a, 8b face the hot medium S and some of which 8c, 8d face the cold medium W, the length and the position of the heat pipes 10 in the axial direction in relation to the gaskets is selected so that the cooling effect is exerted on only some of these gaskets.

Still yet another feature of the invention resides broadly in the seal device, characterized by the fact that the heat pipes 10 extend with their "hot spot" 10' only into the vicinity of the gaskets 8c, 8d facing the cold medium W FIG. 6.

Another feature of the invention resides broadly in the seal device, characterized by the fact that the heat pipes 10 extend with their "hot spot" 10' into the vicinity of the gaskets 8a, 8b facing the hot medium S, but the wall of the heat pipes 10 in the vicinity of the gaskets 8c, 8d facing the cold medium W is designed with thermal insulation 14 FIG. 7.

Yet another feature of the invention resides broadly in the seal device, characterized by the fact that the capillaries 11 are formed by at least one wire mesh running along the inside wall of the heat pipe 10.

Still another feature of the invention resides broadly in the seal device, characterized by the fact that the capillaries 11 are formed by parallel, preferably helical channels running on the inside wall of the heat pipe 10.

As has been mentioned further above, there are several possibilities for a cooling medium used in accordance with the present invention. Generally, fluids with good thermal conductivity are preferred. Preferably, the cooling medium has a boiling temperature similar to that of water. For example, examples of alcohols which may be used in accordance with the embodiments of the present invention are: n-Propyl (boiling point=97° C.), sec-Butyl (boiling point=99.5° C.), and tert-Pentyl (boiling point=102° C.). These and other alcohols are listed in *Organic Chemistry* (Morrison, Robert T. and Boyd, Robert N., Third Edition; Allyn and Bacon, Inc., Boston), particularly on p. 495 thereof.

Examples of heat pipes and components thereof, including capillary arrangements, which may be utilized in accordance with the embodiments of the present invention, may be found in the following U.S. Patents: U.S. Pat. No. 5,051,146, which issued to Kapolnek, et al. on Sep. 24, 1992; U.S. Pat. No. 4,632,179, which issued to Meijer and Ziph on Dec. 30, 1986; U.S. Pat. No. 4,520,865, which issued to Bizzell on Jun. 4, 1985; and U.S. Pat. No. 4,058,159, which issued to Iriarte on Nov. 15, 1977.

All, or substantially all, of the components and methods of the various embodiments may be used in any combination with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. An ocean-going vessel comprising:

a hull;

shaft means extending within the hull and outwardly therefrom;

a propeller being mounted at an end of said shaft means for propelling said ocean-going vessel;

means for rotatingly driving said shaft means to rotate said propeller;

a shaft support system, disposed at least partly within said hull, for encasing said shaft means;

sealing means, disposed within said shaft support system, for sealing about said shaft means;

a first portion of said shaft means, being disposed in the vicinity of said sealing means, being configured for being in contact with a lubricating medium, the lubricating medium for lubricating said shaft means;

another, second portion of said shaft means, being disposed away from said sealing means, being configured for being in contact with water disposed outside of and about said hull, the outside water generally having a substantially lower temperature, during operation of said propeller, than the lubricating medium;

means for cooling said first portion of said shaft means; said cooling means comprising:

heat pipe means disposed along a longitudinal extent of said shaft means;

a first portion of said heat pipe means being disposed in a thermally conductive relationship with said first portion of said shaft means and with the lubricating medium;

a second portion of said heat pipe means being disposed in a thermally conductive relationship with said second portion of said shaft means and with the outside water;

coolant means for circulating within said heat pipe means;

said heat pipe means having an interior surface portion;

said coolant means being configured for vaporizing, upon thermal interaction with the lubricating medium, at said first portion of said heat pipe means and for condensing, upon thermal interaction with the outside water, at said second portion of said heat pipe means;

capillary means, extending along said interior surface portion of said heat pipe means, for directing return flow of said coolant means between said second portion of said heat pipe means and said first portion of said heat pipe means, when said coolant means has condensed at said second portion of said heat pipe means;

said heat pipe means comprising opposite ends along the longitudinal extend of said shaft means;

said heat pipe means being closed at said opposite ends;

wherein, during operation of said propeller: said sealing means are configured for producing heat, said sealing means have a maximum allowable heating temperature, and said heat pipe means has a pressure prevailing therewithin;

said coolant means having a boiling point at the pressure prevailing within said heat pipe means during operation of said propeller; and said coolant means being configured such that its boiling point, at the pressure prevailing within said heat pipe means during operation of said propeller, is less than the maximum allowable heating temperature of said sealing means.

2. The vessel according to claim 1, wherein, said heat pipe means are configured for circulating said coolant means between said first section of said heat pipe means and said second section of said heat pipe means, upon vaporization of said coolant means at said first portion of said heat pipe means.

3. The vessel according to claim 2, wherein said coolant means comprises at least one of:

water; and an alcohol having a boiling point similar to that of water.

4. The vessel according to claim 3, further comprising:

said sealing means comprising a plurality of gaskets;

a support system for supporting said gaskets;

said heat pipe means being disposed solely in close proximity to said support system.

5. The vessel according to claim 4, further comprising:

said shaft means comprising a shaft and a shaft bushing;

said shaft being configured to rotate said propeller;

said shaft bushing being mounted about said shaft to rotate with said shaft;

said shaft bushing comprising a wall portion disposed directly about said shaft and a flange portion disposed adjacent said propeller;

said heat pipe means being disposed solely within said wall portion of said shaft bushing;

said shaft bushing comprising a first sleeve portion and a second sleeve portion, said first and second sleeve portions being joined at a juncture;

said first sleeve portion comprising a major portion of said wall portion adjacent said shaft;

said second sleeve portion comprising a minor portion of said wall portion adjacent said shaft, all of said wall portion adjacent said sealing means and a major portion of said flange portion;

passage means disposed within said shaft bushing;

said passage means being configured for accommodating said heat pipe means therewithin, said heat pipe means being configured to fit tightly within said passage means;

said passage means being disposed in the vicinity of the juncture between said first sleeve portion and said second sleeve portion of said shaft bushing;

said heat pipe means being configured for being disposed in a thermally conductive relationship with only some of said gaskets;

said plurality of gaskets comprising four gaskets;

two of said gaskets being disposed in the vicinity of the outside water and another two of said gaskets being disposed in the vicinity of the lubricating medium;

said heat pipe means being in a thermally conductive relationship only with the two of said gaskets being disposed in the vicinity of the outside water;

said first portion of said heat pipe means being configured to extend only into a thermally conductive relationship with the two of said gaskets being disposed in the vicinity of the outside water said capillary means comprising at least one of:

at least one wire mesh extending along said interior surface portion of said heat pipe means;

a plurality of helical channels extending along said interior surface portion of said heat pipe means, said helical channels being disposed in parallel;

said coolant means being configured such that its boiling point, at the pressure prevailing within said heat pipe means during operation of said propeller, is slightly less than the maximum allowable heating temperature of said sealing means;

said heat pipe means comprising a plurality of heat pipes;

said passage means comprising a plurality of borings;

said borings being disposed within said shaft bushing and extending parallel to said shaft;

each of said heat pipes being disposed tightly within a corresponding one of said borings;

each of said borings and said heat pipes having a generally cylindrical shape;

a stationary support system for supporting said gaskets;

said stationary support system comprising a plurality of ring portions;

each of said plurality of ring portions extending circumferentially about said shaft means;

said plurality of ring portions being disposed adjacent one another along the longitudinal extent of said shaft means;

said plurality of ring portions comprising five ring portions;

each of said gaskets being supported between two adjacent said ring portions;

said wall portion of said shaft bushing having a thickness;

each said boring having a diameter equal to about half the thickness of said wall portion of said shaft bushing;

each of said heat pipes comprising a thermally conductive material;

each of said heat pipes defining a chamber therewithin, said chamber being defined by said closed ends and said interior surface portion;

said heat pipes being distributed at substantially uniform intervals from one another in a circle about said shaft; and said gaskets comprising at least one of:
a plurality of lip seals; and
a plurality of rotating mechanical seals.

6. A stern tube seal of a deep-draft vessel, the deep-draft vessel comprising: a hull; shaft means extending within the hull and outwardly therefrom; a propeller being mounted at an end of the shaft means for propelling the vessel; means for rotatingly driving the shaft means to rotate the propeller; a shaft support system, disposed at least partly within the hull, for encasing the shaft means; a first portion of the shaft means being configured for being in contact with a lubricating medium, the lubricating medium for lubricating the shaft means; another, second portion of the shaft means being configured for being in contact with water disposed outside of and about the hull, the outside water generally having a substantially lower temperature than the lubricating medium during operation of the propeller; said stern tube seal comprising:

sealing means, disposed within the shaft support system, for sealing about the shaft means;

said sealing means being disposed in the vicinity of the first portion of the shaft means and away from the second portion of the shaft means;

means for cooling said first portion of the shaft means; said cooling means comprising:

heat pipe means for being disposed along a longitudinal extent of the shaft means;

a first portion of said heat pipe means for being disposed in a thermally conductive relationship with said first portion of the shaft means and with the first medium;

a second portion of said heat pipe means for being disposed in a thermally conductive relationship with said second portion of the shaft means and with the second medium;

coolant means for circulating within said heat pipe means;

said heat pipe means having an interior surface portion;

said coolant means being configured for vaporizing, upon thermal interaction with the first medium, at said first portion of said heat pipe means and for condensing, upon thermal interaction with the second medium, at said second portion of said heat pipe means; and capillary means, extending along said interior surface portion of said heat pipe means, for directing return flow of said coolant means between said second portion of said heat pipe means and said first portion of said heat pipe means, when said coolant means has condensed at said second portion of said heat pipe means;

said heat pipe means comprising opposite ends along the longitudinal extent of the shaft means;

said heat pipe means being closed at said opposite ends;

wherein, during operation of said propeller: said sealing means are configured for producing heat, said sealing means have a maximum allowable heating temperature, and said heat pipe means has a pressure prevailing therewithin;

said coolant means having a boiling point at the pressure prevailing within said heat pipe means during operation of the propeller; and said coolant means being configured such that its boiling point, at the pressure prevailing within said heat pipe means during operation of the propeller, is less than the maximum allowable heating temperature of said sealing means.

7. The seal according to claim 6, wherein, said heat pipe means are configured for circulating said coolant means between said first section of said heat pipe means and said second section of said heat pipe means, upon vaporization of said coolant means at said first portion of said heat pipe means.

8. The seal according to claim 7, wherein said coolant means comprises at least one of:
water; and
an alcohol having a boiling point similar to that of water.

9. The seal according to claim 8, further comprising:
said sealing means comprising a plurality of gaskets;
a support system for supporting said gaskets;
said heat pipe means being disposed solely in close proximity to said support system.

10. The seal according to claim 9, wherein the shaft means comprises a shaft and a shaft bushing; the shaft is configured to rotate said propeller; the shaft bushing is mounted about the shaft to rotate with the shaft; the shaft bushing comprises a wall portion disposed directly about said shaft and a flange portion disposed adjacent said propeller; said seal further comprising:

said heat pipe means for being disposed solely within the wall portion of the shaft bushing;

the shaft bushing comprising a first sleeve portion and a second sleeve portion, the first and second sleeve portions being joined at a juncture;

the first sleeve portion comprising a major portion of the wall portion adjacent the shaft;

the second sleeve portion comprising a minor portion of the wall portion adjacent said shaft, all of the wall portion adjacent said sealing means and a major portion of the flange portion;

passage means for being disposed within the shaft bushing;

said passage means being configured for accommodating said heat pipe means therewithin, said heat pipe means being configured to fit tightly within said passage means;

said passage means for being disposed in the vicinity of the juncture between tue first sleeve portion and the second sleeve portion of said shaft bushing;

said heat pipe means being configured for being disposed in a thermally conductive relationship with only some of said gaskets;

said plurality of gaskets comprising four gaskets;

two of said gaskets being disposed in the vicinity of the outside water and another two of said gaskets being disposed in the vicinity of the lubricating medium;

said heat pipe means being in a thermally conductive relationship only with the two of said gaskets being disposed in the vicinity of the lubricating medium;

said first portion of said heat pipe means being configured to extend to be in a thermally conductive relationship with the two of said gaskets disposed in the vicinity of the lubricating medium;

thermal insulation means, surrounding said heat pipe means, for thermally insulating said heat pipe means from the two of said gaskets being disposed in the vicinity of the outside water;

said capillary means comprising at least one of:
at least one wire mesh extending along said interior surface portion of said heat pipe means;
a plurality of helical channels extending along said interior surface portion of said heat pipe means,
said helical channels being disposed in parallel;

said coolant means being configured such that its boiling point, at the pressure prevailing within said heat pipe means during operation of said propeller, is slightly less than the maximum allowable heating temperature of said sealing means;

said heat pipe means comprising a plurality of heat pipes;

said passage means comprising a plurality of borings;

said borings for being disposed within the shaft bushing and for extending parallel to the shaft;

each of said heat pipes being disposed tightly within a corresponding one of said borings;

each of said borings and said heat pipes having a generally cylindrical shape;

a stationary support system for supporting said gaskets;

said stationary support system comprising a plurality of ring portions;

each of said plurality of ring portions extending circumferentially about the shaft means;

said plurality of ring portions being disposed adjacent one another along the longitudinal extent of the shaft means;

said plurality of ring portions comprising five ring portions;

each of said gaskets being supported between two adjacent said ring portions;

the wall portion of the shaft bushing having a thickness;

each said boring having a diameter equal to about half the thickness of the wall portion of the shaft bushing;

each of said heat pipes comprising a thermally conductive material;

each of said heat pipes defining a chamber therewithin, said chamber being defined by said closed ends and said interior surface portion;

said heat pipes being distributed at substantially uniform intervals from one another in a circle about the shaft; and said gaskets comprising at least one of:
a plurality of lip seals; and
a plurality of rotating mechanical seals.

11. Method of cooling a stern tube seal of an ocean-going vessel, the ocean-going vessel comprising a hull; shaft means extending within the hull and outwardly therefrom; a propeller being mounted at an end of the shaft means for propelling the vessel; means for rotatingly driving the shaft means to rotate the propeller; a shaft support system, disposed at least partly within the hull, for encasing the shaft means; a first portion of the shaft means being configured for being in contact with a lubricating medium, the lubricating medium for lubricating the shaft means; another, second portion of the shaft means being configured for being in contact with water disposed outside of and about the hull; the outside water generally having a substantially lower temperature than the lubricating medium during operation of the propeller; said method comprising:

providing sealing means for sealing about the shaft means and disposing the sealing means within the shaft support system, for sealing about the shaft means;

disposing the sealing means in the vicinity of the first portion of the shaft means and away from the second portion of the shaft means;

providing means for cooling the first portion of the shaft means;

providing heat pipe means for the cooling means;

disposing the cooling means along a longitudinal extent of the shaft means;

disposing a first portion of the heat pipe means in a thermally conductive relationship with the first portion of the shaft means and with the lubricating medium;

disposing a second portion of the heat pipe means in a thermally conductive relationship with the second portion of the shaft means and with the outside water;

providing coolant means for circulating within the heat pipe means;

providing the heat pipe means with an interior surface portion;

configuring the coolant means for vaporizing, upon thermal interaction with the lubricating medium, at the first portion of the heat pipe means and for condensing, upon thermal interaction with the outside water, at the second portion of the heat pipe means; and providing capillary means for extending along the interior surface portion of the heat pipe means, for directing return flow of the coolant means between the second portion of the heat pipe means and the first portion of the heat pipe means, when the coolant means has condensed at the second portion of the heat pipe means;

said method further comprising the steps of:

sealing the sealing means about the shaft means;

cooling the first portion of the shaft means by way of the following steps:

circulating the coolant means within the heat pipe means;

effecting thermal interaction of the coolant means with the lubricating medium;

effecting thermal interaction of the coolant means with the outside water;

vaporizing the coolant means upon thermal interaction with the lubricating medium, at the first portion of the heat pipe means condensing the coolant means upon thermal interaction with the outside water, at the second portion of the heat pipe means;

directing, by means of the capillary means, return flow of the coolant means between the second portion of the heat pipe means and the first portion of the heat pipe means, when the coolant means has condensed at the second portion of the heat pipe means;

configuring the heat pipe means to include opposite ends along the longitudinal extent of the shaft means;

closing the heat pipe means at the opposite ends;

configuring the vessel such that, during operation of the propeller: the sealing means are configured for producing heat, the sealing means have a maximum allowable heating temperature, the heat pipe means has a pressure prevailing therewithin, and the coolant means has a boiling point at the pressure prevailing within the heat pipe means during operation of the propeller;

configuring the coolant means such that its boiling point, at the pressure prevailing within the heat pipe means during operation of the propeller, is less than the maximum allowable heating temperature of the sealing means; and heating the coolant means, during operation of the propeller, to a temperature less than the maximum allowable heating temperature of the sealing means.

12. The method according to claim 11, further comprising:

configuring the heat pipe means for circulating the coolant means between the first section of the heat pipe means and the second section of the heat pipe means, upon vaporization of the coolant means at the first portion of the heat pipe means; and upon vaporization of the coolant means at the first portion of the heat pipe means, circulating the coolant means between between the first section of the heat pipe means and the second section of the heat pipe means.

13. The method according to claim 12, further comprising:

configuring the coolant means to comprise at least one of:

water; and an alcohol having a boiling point similar to that of water.

14. The method according to claim 13, further comprising the steps of:

providing, for the sealing means, a plurality of gaskets;

providing a support system for supporting the gaskets;

disposing the heat pipe means solely in close proximity to the support system;

providing, for the shaft means, a shaft and a shaft bushing;

configuring the shaft to rotate the propeller;

mounting the shaft bushing about the shaft to rotate with the shaft;

providing, for the shaft bushing, a wall portion disposed directly about the shaft and a flange portion disposed adjacent the propeller;

disposing the heat pipe means solely within the wall portion of the shaft bushing;

providing, for the shaft bushing, a first sleeve portion and a second sleeve portion, the first and second sleeve portions being joined at a juncture;

configuring the first sleeve to comprise a major portion of the wall portion adjacent the shaft;

configuring the second sleeve portion to comprise a minor portion of the wall portion adjacent the shaft, all of the wall portion adjacent the sealing means and a major portion of the flange portion;

providing passage means within the shaft bushing;

configuring the passage means for accommodating the heat pipe means therewithin;

configuring the heat pipe means to fit tightly within the passage means;

disposing the passage means in the vicinity of the juncture between the first sleeve portion and the second sleeve portion of the shaft bushing;

configuring the heat pipe means for being disposed in a thermally conductive relationship with only some of the gaskets;

providing, for the plurality of gaskets, four gaskets;

disposing two of the gaskets in the vicinity of the outside water and disposing another two of the gaskets in the vicinity of the lubricating medium;

configuring the heat pipe means to be in a thermally conductive relationship only with the two of the gaskets being disposed in the vicinity of the lubricating medium;

configuring the first portion of the heat pipe means to extend to be in a thermally conductive relationship with the two of the gaskets disposed in the vicinity of the lubricating medium;

providing thermal insulation means, surrounding the heat pipe means, for thermally insulating the heat pipe means from the two of the gaskets being disposed in the vicinity of the outside water;

providing, for the capillary means, at least one of:

at least one wire mesh extending along the interior surface portion of the heat pipe means;

a plurality of helical channels extending along the interior surface portion of the heat pipe means, the helical channels being disposed in parallel;

configuring the coolant means such that its boiling point, at the pressure prevailing within the heat pipe means during operation of the propeller, is slightly less than the maximum allowable heating temperature of the sealing means;

during operation of the propeller, heating the coolant means to a temperature slightly less than the maximum allowable heating temperature of the sealing means;

providing, for the heat pipe means, a plurality of heat pipes;

providing, for the passage means, a plurality of borings;

disposing the borings within the shaft bushing such that they parallel to the shaft;

disposing each of the heat pipes tightly within a corresponding one of the borings;

configuring each of the borings and the heat pipes to have a generally cylindrical shape;

providing a stationary support system for supporting the gaskets;

providing, for the stationary support system, a plurality of ring portions;

disposing each of the plurality of ring portions to extend circumferentially about the shaft means;

disposing the plurality of ring portions adjacent one another along the longitudinal extent of the shaft means;

providing, for the plurality of ring portions, five ring portions;

supporting each of the gaskets between two adjacent the ring portions;

providing the wall portion of the shaft bushing with a thickness;

configuring each of the borings to have a diameter equal to about half the thickness of the wall portion of the shaft bushing;

configuring each of the heat pipes to comprise thermally conductive material;

configuring each of the heat pipes to define a chamber therewithin, the chamber being defined by the closed ends and the interior surface portion;

distributing the heat pipes at substantially uniform intervals from one another in a circle about the shaft; and providing, for the gaskets, at least one of:
  a plurality of lip seals; and
  a plurality of rotating mechanical seals.

* * * * *

UNITED STATES PATENT AND TRADEMARK OFFICE
CERTIFICATE OF CORRECTION

PATENT NO. : 5,308,269
DATED : May 3, 1994
INVENTOR(S) : Ernst-Peter von BERGEN and Günter PIETSCH It is certified that error appears in the above-indentified patent and that said Letters Patent is hereby corrected as shown below:

In column 7, line 4, after 'spot' delete "10," and insert --10'--.

Signed and Sealed this

Tenth Day of September, 1996

Attest:

BRUCE LEHMAN

Attesting Officer     Commissioner of Patents and Trademarks